US008675261B2

(12) United States Patent
Green

(10) Patent No.: US 8,675,261 B2
(45) Date of Patent: Mar. 18, 2014

(54) SECURITY ELEMENTS AND METHODS OF MANUFACTURE

(75) Inventor: Stephen Banister Green, Hedge End (GB)

(73) Assignee: De La Rue International Limited, Basingstoke (GB)

( * ) Notice: Subject to any disclaimer, the term of this patent is extended or adjusted under 35 U.S.C. 154(b) by 167 days.

(21) Appl. No.: 13/387,052

(22) PCT Filed: Aug. 3, 2009

(86) PCT No.: PCT/GB2009/001909
§ 371 (c)(1),
(2), (4) Date: Mar. 21, 2012

(87) PCT Pub. No.: WO2011/015798
PCT Pub. Date: Feb. 10, 2011

(65) Prior Publication Data

US 2012/0176652 A1 Jul. 12, 2012

(51) Int. Cl.

| | |
|---|---|
| ***G06K 15/02*** | (2006.01) |
| ***B32B 3/00*** | (2006.01) |
| ***H04L 9/32*** | (2006.01) |
| ***G09C 1/00*** | (2006.01) |
| ***B41C 1/14*** | (2006.01) |
| ***G06K 19/00*** | (2006.01) |

(52) U.S. Cl.
USPC ........... 358/3.28; 101/128.4; 283/17; 283/57; 726/26; 428/172; 235/487

(58) Field of Classification Search
USPC ................... 358/3.28; 101/128.4; 283/17, 57; 726/26; 428/172; 235/487
See application file for complete search history.

(56) References Cited

U.S. PATENT DOCUMENTS 3,938,088 A 2/1976 Clark
3,987,725 A * 10/1976 Scantlin .................... 101/128.4

(Continued)

FOREIGN PATENT DOCUMENTS

DE 36 28 353 A1 2/1988
DE 199 34 434 A1 2/2001

(Continued)

OTHER PUBLICATIONS

International Preliminary Report on Patentability issued in International Patent Application No. PCT/GB2009/001909 dated Dec. 9, 2011.

(Continued)

*Primary Examiner* — Charlotte M Baker
(74) *Attorney, Agent, or Firm* — Oliff PLC

(57) ABSTRACT

Methods of manufacturing a security element for a security document include: a first portion of the security document, the first portion of the security document having at least one aperture therethrough, the or each aperture being defined by an internal surface of the first portion of the document; and either printing through the first portion of the security document such that ink is deposited onto at least a part of the internal surface of the at least one aperture, or printing through the first portion of the security document onto a second portion of the security document provided behind the first portion of the security document, such that ink is deposited onto at least a part of the second portion of the security document aligned with the at least one aperture.

70 Claims, 9 Drawing Sheets

(56) References Cited

U.S. PATENT DOCUMENTS

| | | | | |
|---|---|---|---|---|
| 6,164,701 | A | 12/2000 | Murl | |
| 8,220,835 | B2 * | 7/2012 | Green | 283/17 |
| 2004/0011874 | A1 | 1/2004 | Theodossiou et al. | |
| 2010/0043076 | A1 * | 2/2010 | Wesby | 726/26 |
| 2010/0304093 | A1 * | 12/2010 | Hagemann et al. | 428/172 |

FOREIGN PATENT DOCUMENTS

| | | | |
|---|---|---|---|
| EP | 0 160 504 | A2 | 11/1985 |
| EP | 0 549 507 | A2 | 6/1993 |
| EP | 0 703 094 | A1 | 3/1996 |
| EP | 1 747 904 | A1 | 1/2007 |
| JP | A-2006-224476 | | 8/2006 |
| WO | WO 95/26274 | | 10/1995 |
| WO | WO 2006/025016 | A1 | 3/2006 |
| WO | WO 2008/007064 | A1 | 1/2008 |

OTHER PUBLICATIONS

International Search Report issued in International Patent Application No. PCT/GB2009/001909 dated Aug. 19, 2010.

* cited by examiner

SECURITY ELEMENTS AND METHODS OF MANUFACTURE

This invention relates to methods of manufacturing security elements for security documents such as currency, passports, identification cards and other documents of value.

In the field of security documents, there is a constant need to improve the security of the document. That is, to deter potential counterfeiters by increasing the difficulty of making accurate copies of the document, and to enable effective authentication, i.e. testing that the document is genuine. To this end, security documents currently make use of a number of measures, including security printing such as intaglio printing and guilloches, watermarking, embossing, magnetic features and optically variable elements such as holograms, to name but a few. What is key to a security element's success is that the element is difficult for a forger to replicate and also difficult for a forger to modify or re-use.

A further specific problem that may be encountered is the substitution of certain parts of a security document in fraudulent attempts either to make more than one counterfeit document out of a single genuine original, or to replace genuine personalisation information with that of a fraudulent holder. The latter is particularly the case for passports and identification cards.

One security feature which has been put to use in various types of security document consists of perforations. A well-known example is the perforated passport serial number found in many passport booklets, such as the present UK passport. This comprises an array of holes passing through one or more pages of the document and arranged in the form of a number or other code. It is very difficult for an existing perforated code to be significantly modified without the modification being readily apparent. Further, the manner in which the perforation is carried out can be used to impart certain characteristics to the resulting holes which are difficult if not impossible to replicate other than by the same perforation means. For example, laser perforation can lead to an observable 'rough' edge of the perforation and/or scorching. Since suitable lasers are not widely available, this further increases the security of the document. Despite this, perforations alone are not generally considered to provide an adequate level of security and also do not readily assist in detecting substitution of portions of the document.

In accordance with a first aspect of the present invention, a method of manufacturing a security element for a security document comprises: providing a first portion of the security document, the first portion of the security document having at least one aperture therethrough, the or each aperture being defined by an internal surface of the first portion of the document; and printing through the first portion of the security document such that ink is deposited onto at least a part of the internal surface of the at least one aperture.

By printing a document over an existing perforation (i.e. passing ink through the at least one aperture) ink can be deposited onto internal surfaces of the apertures, i.e. the 'cut' surfaces of the material forming the security document. This differs from conventional perforated documents (which are printed prior to perforation), where the appearance of the interior of each hole will match the rest of the document surface and/or exhibit visual characteristics attributed to the method of perforation (e.g. blackening due to laser perforation). By applying ink to the interior surfaces of the apertures, a number of advantages are achieved. Significantly, since the interior surface of an aperture is not overtly conspicuous, it can be used to provide a security feature which is not immediately obvious to the observer. In some examples, the very presence (or absence) of ink on the internal surface of the at least one aperture can be used to deduce whether the document is genuine. For instance, where an image is printed onto a surface of a document having one or more apertures therethrough, inspection of the internal surface of the apertures can indicate whether the image was printed before or after the perforations were made. In other cases, the printing step may be arranged such that ink is only deposited onto the interior surface of the apertures (and not substantially elsewhere), the presence thereof being used to test for authenticity. The internal surfaces of the apertures can also be used to provide additional information which is largely concealed from the casual observer, as described in more detail below.

The aforementioned method can be carried out during the manufacture of the security document (i.e. being applied similarly to all of the documents being produced) or during a later personalisation step in which each such security document is provided with information distinguishing that security document from other like security documents.

Depending on how the at least one aperture has been formed, the ink deposited on the internal surface of the aperture may be observable from a viewing angle normal to the first portion of the security document and/or from an acute viewing angle. In the latter case, in certain embodiments it is preferable that the deposited ink is not substantially observable from the normal viewing position but more generally it is preferred that the observable impression produced by the deposited ink is enhanced upon viewing from an acute angle. It should be noted that, whilst described as "observable", the ink need not be visible to a human observer but rather it could be invisible (i.e. reflecting and/or emitting outside the visible wavelength spectrum) and/or requiring magnifying means for visual detection.

Preferably, at least a portion of the at least one aperture has a cross-sectional area which decreases with depth of the aperture through the first portion of the security document. For example, at least a portion of the aperture may be substantially conical, frustoconical or pyramidal. Apertures having such shapes can be produced, for example, by laser perforation or the use of suitably shaped mechanical pins. The 'narrowing' dimension helps to ensure that ink is deposited onto more of the aperture's internal surface, preferably along the whole depth of the aperture, and also increases the visibility of the ink to an observer. However, this shaping need not be continued through the whole aperture depth: for example, in the case of apertures produced by mechanical pins, it is generally found that an upper portion of the aperture has a curved conical shape, continuing into a cylinder with essentially parallel sides.

Preferably, the first portion of the security document has an array of apertures therethrough, at least some of the array of apertures having ink deposited onto at least a part of their internal surface in the printing step. The provision of multiple apertures in this way greatly enhances the opportunities for a more complex (and therefore more difficult to forge) security element.

As described above, the deposited ink could be observable from the normal. However, in a particularly preferred example, in the printing step, the deposition of ink onto the internal surfaces of the array of apertures is varied such that when the array is viewed at an acute angle, a latent image formed by the deposited ink becomes apparent. By 'becomes apparent', it is meant that the visual effect of the deposited ink is enhanced when viewed at an acute angle, relative to its appearance from a normal viewing position. The latent image could form a symbol, an alpha-numeric code or any other graphic. As indicated above, it will be appreciated that the image need not be apparent in the visible spectrum since non-visible inks may be selected.

The latent image could be formed by varying the ink deposition in a number of ways. In one preferred example, ink is deposited onto at least part of the internal surface of one or more selected aperture(s) forming a subset of the array, such that the selected subset of apertures become apparent relative to the remainder of the array when viewed at an acute angle, thereby forming the latent image. It should be noted that the "printed" apertures could constitute the foreground or background of the latent image.

In another preferred embodiment, in the printing step, an optical characteristic of the deposited ink is varied across the internal surface(s) and/or between apertures, the optical characteristic being preferably colour and/or intensity. Variation in the appearance of the ink can be used to input additional information into the document on the internal surfaces of the apertures. Again, the 'colour' need not be a visible colour—e.g. the ink could include IR or UV active regions. In a particularly preferred embodiment, the optical characteristic of the deposited ink is varied to form a latent image which becomes apparent when the first portion of the document is viewed at an acute angle ('becoming apparent' having the same meaning as above). This permits the formation of a more complex and varied latent image.

As noted above, the printing step could involve printing an image (i.e. any indicia) onto a face surface of the security document which includes the apertures such that, when the internal surfaces are inspected, the ink deposited thereon is continuous with the printed image. However, in a preferred embodiment, in the printing step, ink is only deposited onto at least a part of the internal surface of the at least one aperture and not substantially onto any other surface of the first portion of the security document (i.e. not over the face of the document portion). This leads to a particularly unobtrusive security feature and can be achieved, for example, by using a mask during the printing step.

Preferably, the first portion of the security document comprises multiple layers, the or each aperture passing through all of the layers, the interior surface of the or each aperture comprising edges of the multiple layers and at least some of the edges of the multiple layers receiving ink in the printing step. In this way, multiple layers of the document (e.g. pages of a booklet) can be provided simultaneously with individual security elements and at the same time form one cohesive security element in combination with one another. For instance, where multiple layers may conceivably be separated, matching of the ink deposited on the interior surfaces can be used to confirm that none of the layers have been substituted.

In a particularly preferred example, in the printing step, an outermost layer of the multiple layers masks the remaining layer(s) from receiving ink except in the vicinity of the or each aperture, such that at least one of the multiple layers has ink deposited only on one or more edges forming part of the interior surface of the or each aperture. This technique both provides the multiple security elements mentioned above and ensures that, on all but the outermost layer, ink is only deposited onto the internal surface of the aperture(s) and not substantially onto any other surface of the first portion of the security document, in a single step.

In accordance with a second aspect of the present invention, a method of manufacturing a security element for a security document comprises: providing a first portion of the security document, the first portion of the security document having at least one aperture therethrough, the or each aperture being defined by an internal surface of the first portion of the document; and printing through the first portion of the security document onto a second portion of the security document provided behind the first portion of the security document, such that ink is deposited onto at least a part of the second portion of the security document aligned with the at least one aperture.

By printing onto a second portion of the security document through perforations in a first portion of the security document, the ink deposited onto the second portion of the security document is precisely in register with the or each aperture in the first portion of the document. By 'aligned' it is meant that the edge(s) of the printed area(s) on the second portion of the security document precisely follow the edge of the at least one aperture. Examining the print on the second portion of the security document through the perforations therefore provides a quick and reliable test revealing whether either of the portions has been substituted, since it will be near impossible for a counterfeiter to achieve the necessary level of alignment.

This could be implemented using a single aperture, but in order to increase the complexity and hence security of the element, it is preferable that the first portion of the security document has an array of apertures therethrough, ink being deposited onto the second portion of the security document aligned with a selected subset or all of the array of apertures.

If desired, the printing step could be controlled such that ink is deposited only onto the second portion of the security document and not onto the first. However, it is preferable that in the printing step, ink is additionally deposited onto at least a part of the first portion of the security document. This allows a comparison of the deposited ink to be made between the first and second portions of the security document. If the deposited ink is continuous between the two portions, this can be taken as an indication of authenticity. Typically, this would involve the deposit of ink onto at least a part of the internal surface of the at least one aperture. This additionally provides the advantages already discussed above in respect of the first aspect of the invention.

In a particularly preferred embodiment, the printing step comprises printing an image through the first portion of the security document, such that a first portion of the printed image is deposited on the first portion of the security document, and a second portion of the printed image is deposited on the second portion of the security document, the first and second portions of the printed image being in register with one another. By simultaneously printing two partial images in this way, the first and second portions of the image are formed precisely in register with one another. That is, when the two portions of the security document are correctly aligned, the two portions of the printed image will visually combine to reproduce the whole image. If the two portions of the security documents are misaligned even to a small extent, this will be very conspicuous to an observer.

The so-produced security element therefore readily identifies whether the first or second portion of the security document has been modified or substituted. Depending on the type of security document in question, the first and second portions of the security document may be immovable relative to each other (in everyday use). For example, the various layers of a laminate identification card or a laminate banknote (comprising multiple polymeric layers or a combination of polymeric and paper layers) are not generally separable but could be delaminated by a determined counterfeiter. In other examples, such as a passport booklet or a banknote, the first and second portions of the document (such as individual pages of the passport booklet or spaced areas of the banknote) may not be so fixed. Hence, preferably, where the first and second portions of the security document are connected in a manner permitting movement relative to one another into and out of a reference configuration, the method further comprises holding the first and second portions of the security document in the reference configuration during the printing step, the ink deposited onto the second portion of the document being aligned with the or each aperture when the first and second portions of the security document are in the reference configuration. For example, the "reference configuration" for a passport booklet may involve the pages being held closed or flat against one another, and for a banknote the reference position may involving folding the note such that its corners align.

Security elements produced as described can therefore be implemented in a great variety of security documents. In one preferred example, the security document comprises a booklet having multiple pages bound by a spine, the first portion of the security document comprising at feast one first page of the booklet, and the second portion of the security document comprising at least one second page of the booklet, the at least one first page and the at least one second page being adjacent one another within the booklet. In this example, the security element can be used to confirm that none of the pages making up the first and second portions of the security document have been substituted. The first or second page may be a cover page of the booklet.

In a particularly preferred implementation, the first portion of the security document comprises a plurality of first pages of the booklet. This can be used in combination with the first aspect of the invention to provide multiple security elements throughout the plurality of first pages, as described above. Preferably, the method further comprises holding the at least one first page of the booklet closed against the at least one second page of the booklet during the printing step.

In another preferred example, the security document comprises a flexible sheet document, the first and second portions of the security document being provided on the flexible sheet document, and spaced such that the second portion of the security document can be positioned behind the first portion of the security document by manipulating the flexible sheet document. This may apply to a banknote or certificate, for example.

In this case, the method preferably further comprises folding the flexible sheet document so as to position the second portion of the security document behind the first portion of the security document prior to the printing step. Reference points may additionally be designated for this operation. For example, the corners of the document could be aligned, or marks could be provided on the document for achieving some alternative alignment position.

In yet another example, the security document comprises a laminate structure of multiple layers, the first portion of the security document comprising at least one first layer of the laminate structure, and the second portion of the security document comprising at least one second layer of the laminate structure. For example, this may be of use in identification cards or driving licence cards, or multi-laminate banknote structures, or one of the portions could be a label or transfer which is applied to a security document such as a banknote or passport. In such cases, the various layers of the laminate structure are not movable relative to one another in everyday use and hence the method may further comprise bonding the at least one first layer of the laminate structure to the at least one second layer of the laminate structure prior to the printing step. If the counterfeiter were to attempt to delaminate the card for any reason, it would be extremely difficult to achieve the same level of alignment between the first and second portions of the document thereafter, which will be revealed by the said security element.

The security element of the first aspect of the invention, and that of the second aspect of the invention, can each be implemented in an infinite variety of ways. Preferably where an array of apertures is provided in the first portion of the document, the array of apertures comprises at least two apertures arranged so as to form a perforated image. That is, the location, shape and size of the apertures present a recognisable image independently of any printing step.

The perforated image formed by the at least two apertures may preferably depict one or more of: text, numbers, alphanumerical text, symbols, patterns, graphics and photographs. It should be noted that each aperture could take any outline shape necessary in order to form the desired perforated image.

However, in a particularly preferred example, the apertures forming the matrix are preferably of substantially equal size and/or arranged at a substantially equal spacing from one another. In a particularly preferred example, the matrix is a grid of apertures.

In the security element of the second aspect of the invention, the printed image may depict one or more of: text, numbers, alphanumerical text, symbols, patterns, graphics and photographs. The same applies to the latent image which may be formed according to the first aspect of the invention.

In either aspect of the invention, apertures in the first portion of the document may be formed in a number of ways. In addition, the perforation may be carried out prior to performing the methods of the present invention, or as part of the same process.

In particularly preferred examples, the or each aperture is formed by laser perforation, mechanical perforation or rotary perforation of the first portion of the security document.

The or each aperture can be substantially cylindrical, prismatic, conical, frustoconical or pyramidal. That is, its cross-section may change along the depth of the aperture or may be constant. In particularly preferred embodiments, the cross-section of the or each aperture may be substantially circular, square, rectangular, triangular, polygonal or an irregular shape.

The or each aperture can have any appropriate size. In preferred examples, the cross-section of the or each aperture has a dimension of between around 50 μm and 5 mm, preferably between 50 μm and 2 mm, still preferably between around 50 μm and 1 mm. Where more than one aperture is provided, they need not be of the same size.

The printing step can be carried out using any appropriate technique. In preferred examples, the printing step comprises inkjet printing, dye sublimation, laser printing, lithographic printing, flexographic printing, intaglio printing, gravure printing, screen printing or letterpress printing.

In a preferred implementation, the printing step may be carried out simultaneously with perforation of the first portion of the security documents, using an ink-laden perforation tool, preferably one or more ink-laden pins.

As noted above, the printing step may result in a visible or non-visible print. Thus, preferably, the ink deposited in the printing step comprises any of: visible ink, non-visible ink, UV responsive ink, IR responsive ink, fluorescent ink, luminescent ink, phosphorescent ink, thermochromic ink, photochromic ink and optically variable ink. Optically variable ink is ink whose appearance varies at different viewing angles, such as pearlescent ink, links comprising light interference pigments and inks comprising liquid crystal pigments.

As noted above, in either aspect of the invention, the security element can be applied to any desired security document.

In preferred examples, the document is any of: currency, a banknote, a certificate, a passport booklet, an identification card, a certificate of authentication and a driving licence. In certain examples, the first and/or second portions of the security document may be pre-printed, prior to performance of the methods of the invention, preferably with security prints including any of: intaglio prints, guilloches, fine-line prints, and gravure prints.

The invention also provides a security element for a security document, the security element comprising at least one aperture provided through a first portion of the security document, the or each aperture being defined by an internal surface of the first portion of the document, and ink deposited on at least a part of the internal surface of the at least one aperture.

In particularly preferred embodiments, an array of apertures is provided through the first portion of the security document, at least one of the apertures having ink deposited onto at least a part of the internal surface thereof, and the deposition of ink onto the internal surfaces of the array of apertures varying across the array such that when the array is viewed at an acute angle, a latent image formed by the deposited ink becomes apparent. As previously described, a latent image incorporated into the document in this way provides a high level of security since it is not immediately obvious to an observer, yet can be checked straightforwardly and permits the conveyance of additional information, if desired. In one preferred implementation, one or more selected aperture(s) forming a subset of the array has ink deposited onto at least part of the internal surface(s) thereof, such that the selected subset of apertures become apparent relative to the remainder of the array when viewed at an acute angle, to thereby reveal the latent image.

Additionally or alternatively, an optical characteristic of the deposited ink can be arranged to vary across the internal surface(s) and/or between apertures, the optical characteristic being preferably colour and/or intensity. Preferably, the optical characteristic of the deposited ink varies across the array to form the latent image which becomes apparent when the first portion of the document is viewed at an acute angle.

Advantageously, the deposited ink was deposited simultaneously with or after formation of the aperture. Most preferably, the security element is manufactured using the method of the first aspect of the invention.

The invention further provides a security element for a security document, the security element comprising at least one aperture provided through a first portion of the security document, the or each aperture being defined by an internal surface of the first portion of the document, and a print provided on a second portion of the security document, the print covering at least a part of the second portion of the security document aligned with the at least one aperture, and the print being in register with the at least one aperture.

Preferably, the print has been applied to the second portion of the security document through the at least one aperture. In a particularly preferred embodiment, the print provided on the second portion of the security document forms a second portion of a printed image, a first portion of the printed image being provided on the first portion of the security document, and the first and second portions of the printed image being in register with one another.

Advantageously, the first and second portions of the printed image have been formed in one printing operation, the second portion of the printed image being applied to the second portion of the security document through the at least one aperture.

In particularly preferred implementations, the security element is manufactured using the method of the second aspect of the invention.

The invention further provides a security document comprising at least one security feature as described above. The security document preferably comprises any of; currency, a banknote, a certificate, a passport booklet, an identification card, a certificate of authentication and a driving licence.

Examples of security elements and corresponding methods of manufacture will now be described with reference to the accompanying drawings in which;

FIG. 1 schematically shows exemplary apparatus for manufacturing security elements of the sort described below;

FIG. 2 depicts a security element made according to a first embodiment, and applied to a sheet document, showing enlarged details of certain features of the security element for clarity;

FIGS. 3*a* and 3*b* show two alternative cross-sections through the security element of FIG. 2;

FIGS. 4*a* and 4*b* show cross-sections through a security element made according to a second embodiment;

Figure 7A:
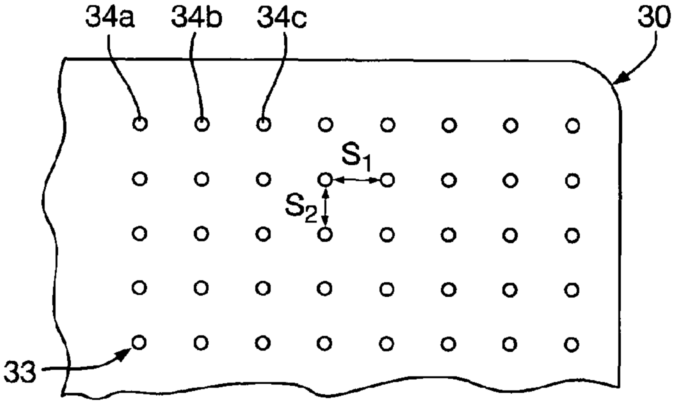
Figure 7B:
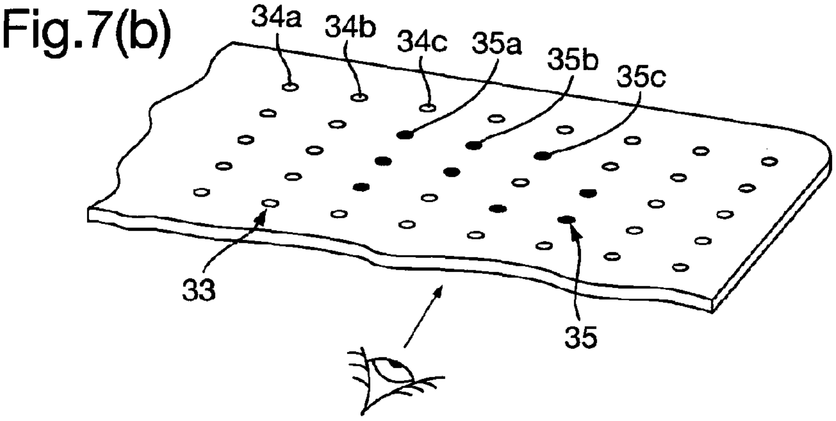
Figure 8:
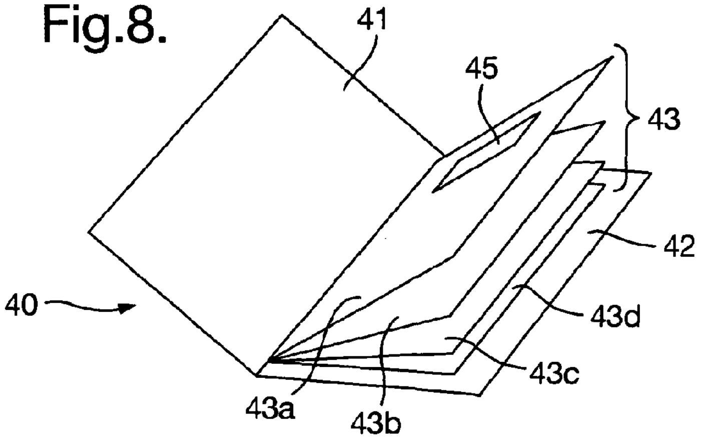
Figure 9:
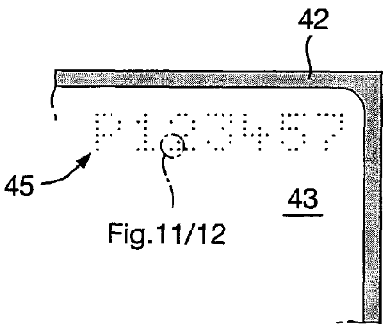
Figure 10:
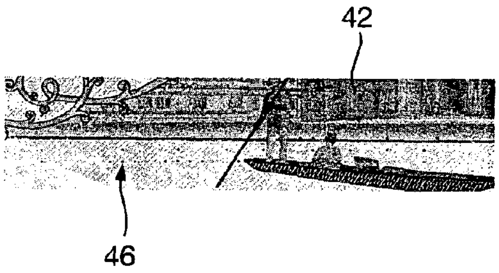
Figure 11A:
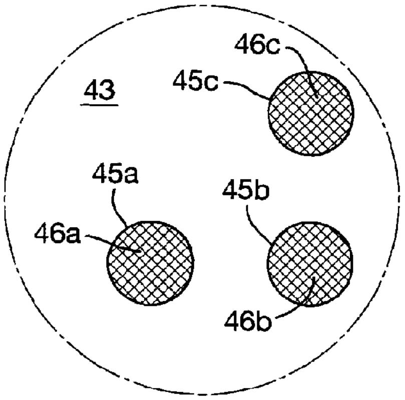
Figure 12A:
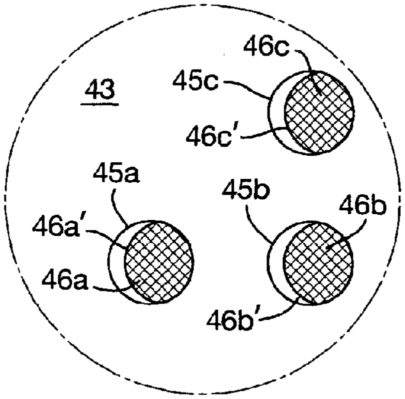
Figure 11B:
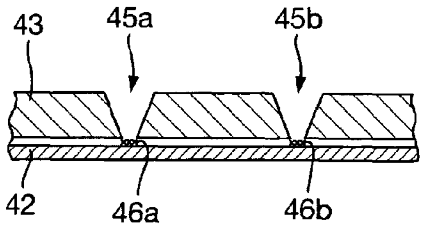
Figure 12B:
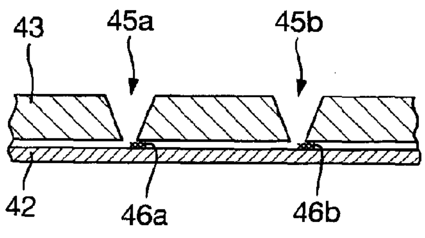
Figure 13:
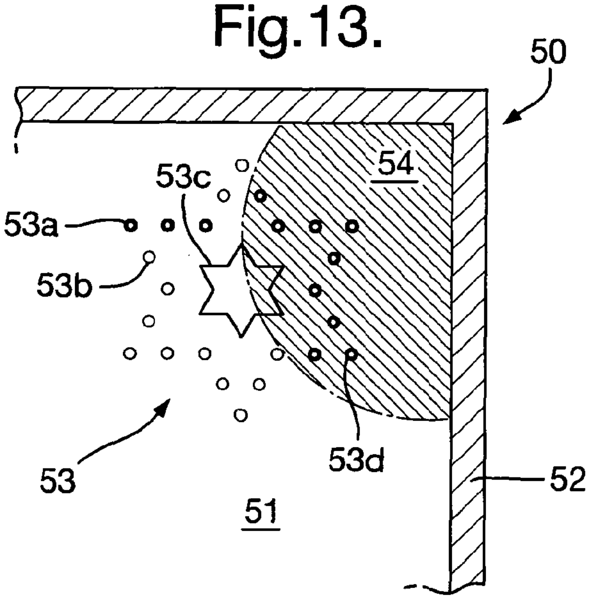
Figure 14:
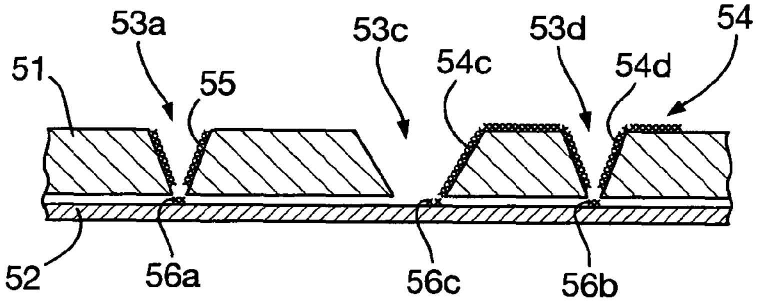
Figure 15:
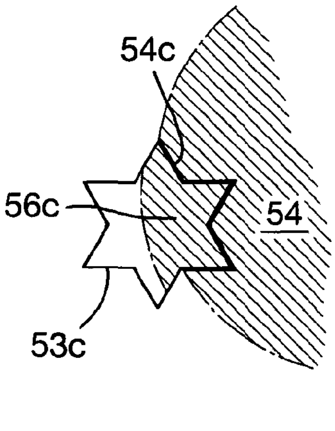
Figure 16:
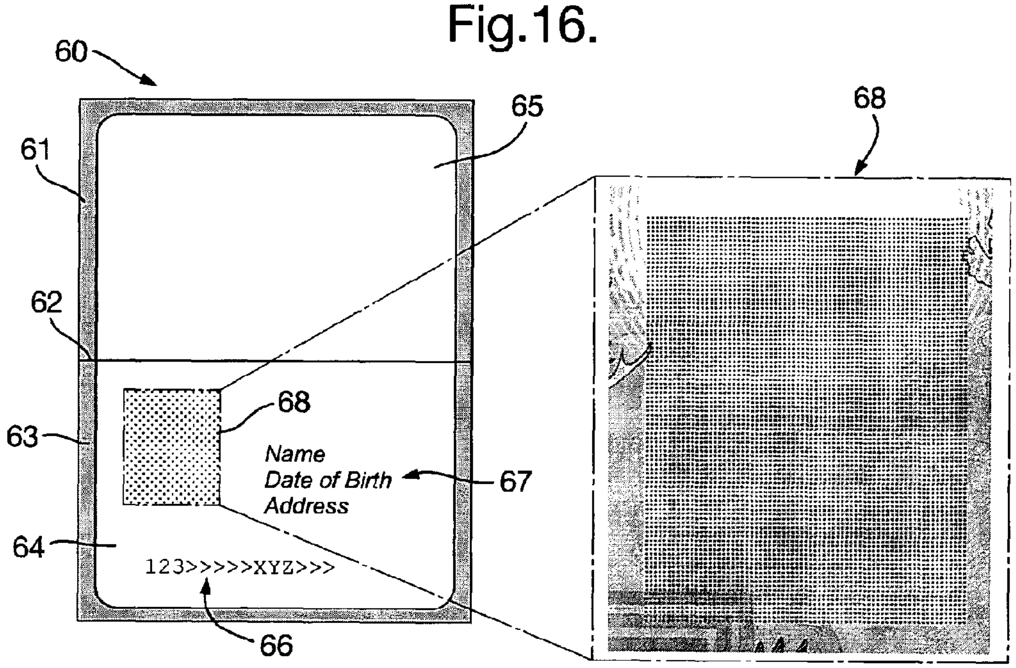
Figure 17A:
Figure 17B:
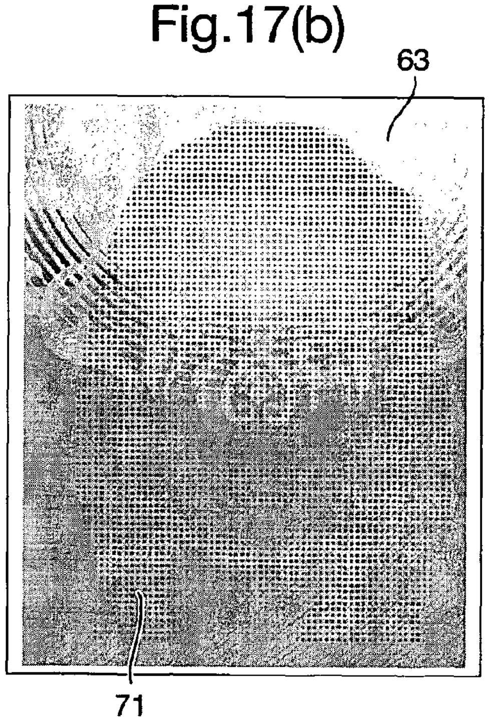
Figure 18:
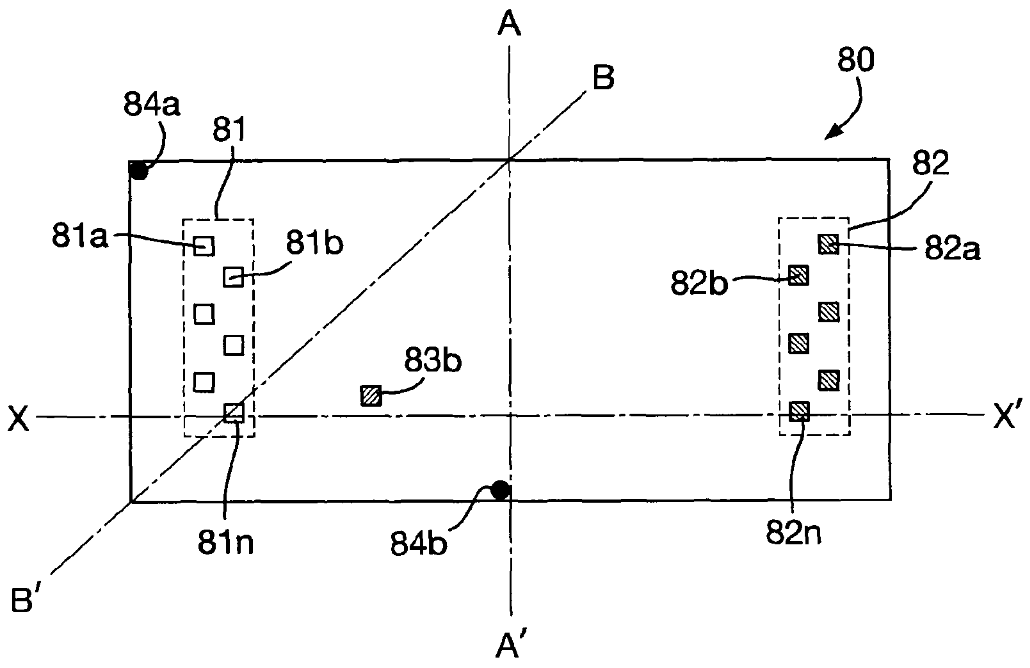
Figure 19:
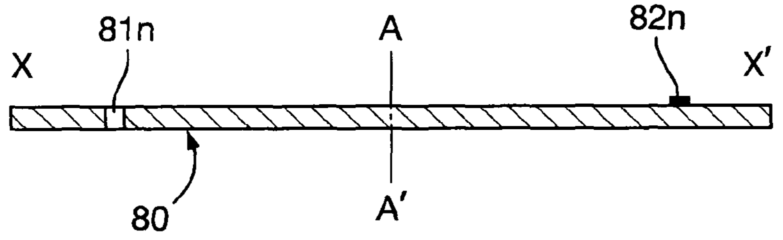
Figure 20:
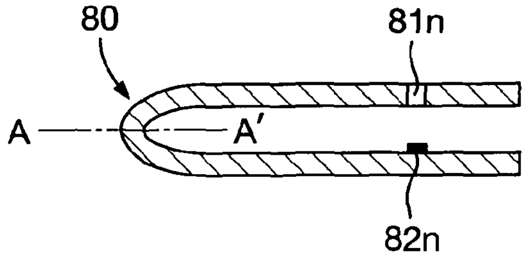
Figure 21A:
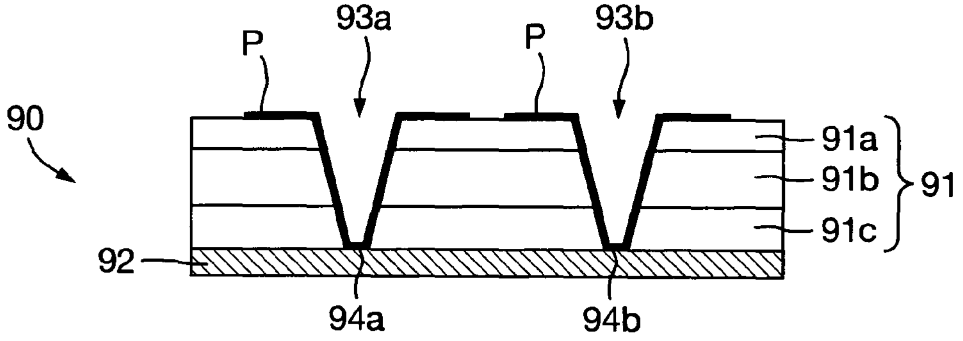
Figure 21B:
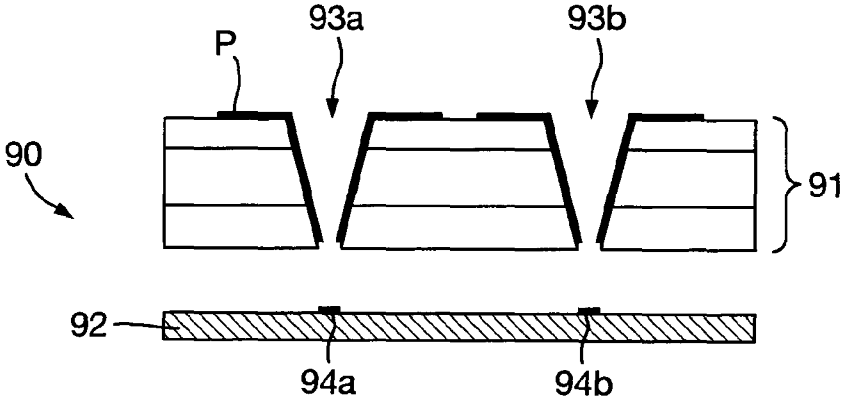
Figure 21C:
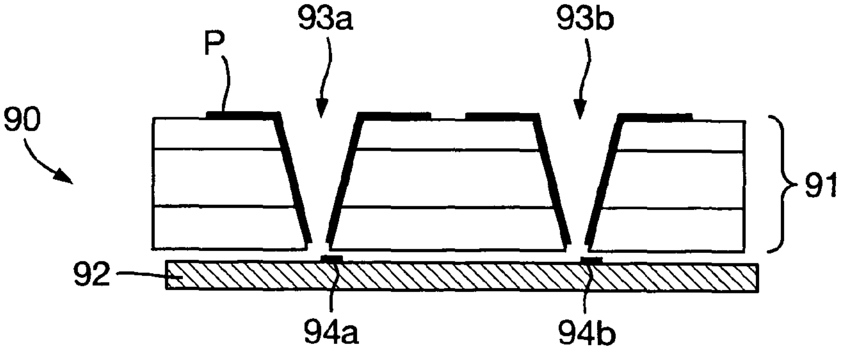

FIG. 7*a* shows the security element of the fourth embodiment in plan view;

FIG. 7*b* shows the security element of the fourth embodiment viewed at an acute angle;

FIG. 8 depicts a security element made according to a fifth embodiment and applied to a security booklet;

FIG. 9 shows an enlarged portion of the security booklet shown in FIG. 8, including a first part of the security element;

FIG. 10 shows another portion of the security booklet of FIG. 8, including a second part of the security element;

FIGS. 11*a* and 11*b* show an enlarged detail of the security element of FIG. 8 in a genuine document, in plan view and cross-section respectively;

FIGS. 12*a* and 12*b* show an enlarged detail of the security element of FIG. 8 in a counterfeit document, in plan view and cross-section respectively;

FIG. 13 shows a security element made according to a sixth embodiment and applied to a security booklet;

FIG. 14 shows a cross-section through a portion of the security element of FIG. 13;

FIG. 15 shows an enlarged detail of the security element of FIG. 13 in a counterfeit document, in plan view;

FIG. 16 shows components of a seventh embodiment of a security element, applied to a security booklet, including an enlarged detail thereof;

FIG. 17*a* shows a first portion of the security element of FIG. 16;

FIG. 17*b* shows a second portion of the security element of FIG. 16;

FIG. 18 depicts a security element made according to an eighth embodiment and applied to a sheet document, in plan view;

FIG. 19 shows a cross-section through the security element of FIG. 18;

FIG. 20 shows the security document to which the security element of FIG. 18 is applied in a manipulated position for formation and/or testing of the security element; and FIGS. 21*a*, 21*b* and 21*c* show cross-sections through a ninth embodiment of the security element, applied to a laminate card.

The description below will focus on the application of security elements to documents such as banknotes, security booklets including passports, and cards such as ID cards, credit cards or the like. However, it will be appreciated that security elements disclosed herein can be used in combination with any document whose authenticity needs to be checkable.

Figure 1:
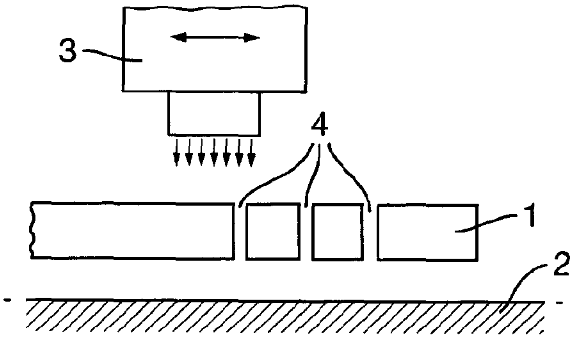

FIG. 1 is a schematic diagram showing apparatus which may be used to manufacture security elements as will be described below. The security document, or a first portion thereof, to which the security element is to be applied is labelled 1. The document 1 is supported on a surface 2 which may be a printing work surface or could be another portion of the same security document. For example, the portion 1 may comprise one or more pages of a passport, and the surface 2 could be the passport cover, both sections being joined to one another at one end (not shown). Alternatively, the document portion 1 may be a stand-alone security document, and surface 2 unconnected, being used solely to support the document 1 during printing.

The document is provided with one or more apertures labelled 4, which pass through the thickness of document portion 1. The perforations 4 may be pre-existing or could be formed in a first step of the process. A printer 3 is provided. In this example, a inkjet printing head is shown, but printing could be carried out using other techniques such as dye sublimation or laser printing. The printer may be adapted to deposit one or more types of ink, each of which may be visible or non-visible and may include security features such as IR or UV responsive substances, luminescent, phosphorescent or fluorescent materials and/or optically variable pigments, to name but a few examples.

The printer 3 can be precisely controlled using well-known techniques to deposit ink as desired across document 1. As will be described in more detail below, printing the document 1 over existing perforations leads to ink being passed through the perforations 4 and deposited onto surface 2. In some embodiments, where the surface 2 is another portion of the same security document, the deposited ink will form part of the resulting security feature, whereas in other embodiments (where the surface 2 is unconnected with the security document portion 1), the deposited ink on the surface 2 will simply be discarded.

It should be noted that a security element can be applied in this manner either during manufacture or as part of a later personalisation step. For instance, for a document such as a passport, ID card or certificate which is ultimately to include information individualising the document (making it distinct from other documents in the same series), the document will typically undergo at least two processing stages. The first, manufacture, involves producing the basic document and the result will generally be a set of identical documents (e.g. blank passports). Various security features such as security prints, watermarks and holograms are often included in the document during manufacture and the present security element can be incorporated at this stage if desired. However, the nature of the element lends itself well to application after manufacture (i.e. to a completed 'blank' document) and it may therefore be made use of for personalisation. As will be described below, the security element enables the incorporation of two distinct forms of information: in the form of perforation, and in print. Either or both can be used to add information (e.g. relating to the document owner) to the document.

Figure 2:
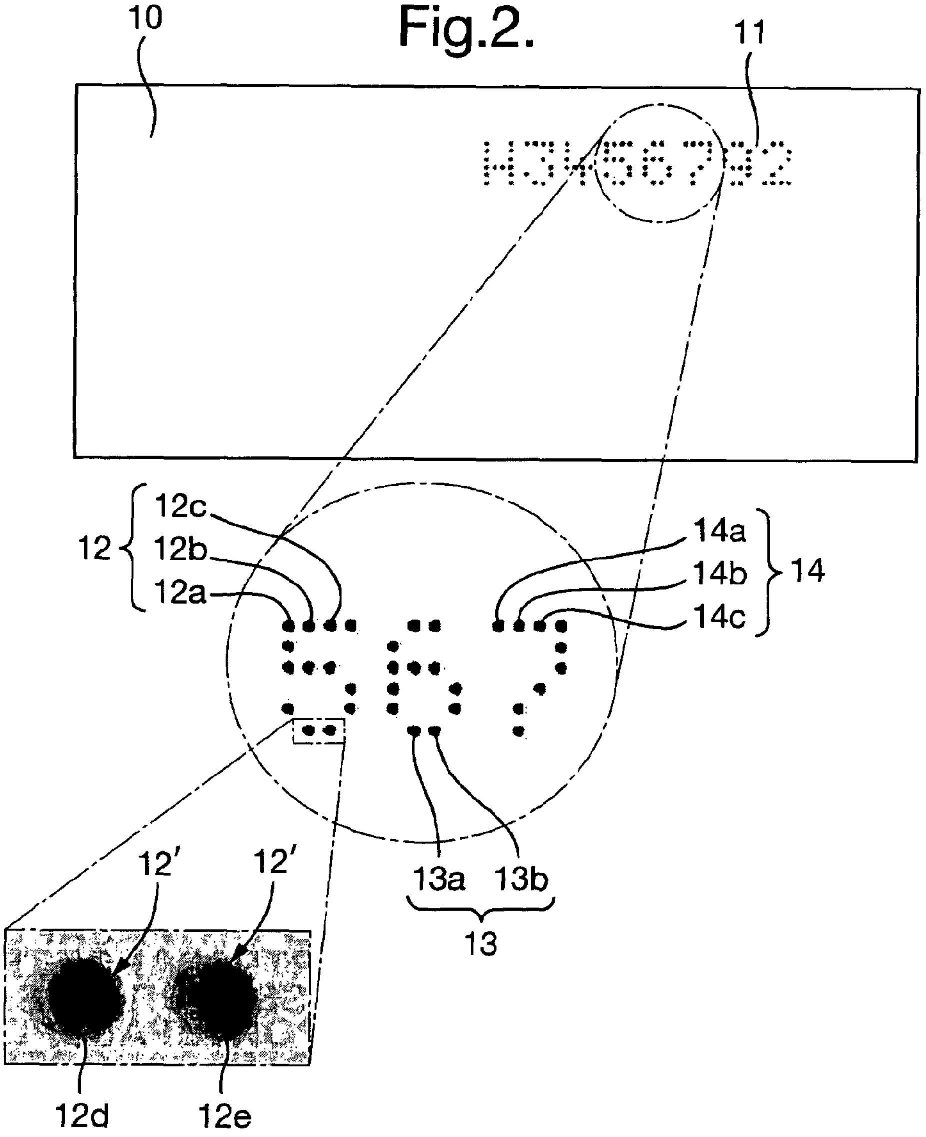

FIG. 2 shows a security document in the form of a sheet document 10 (such as a banknote, cheque or certificate) which is provided with a security element 11 according to a first embodiment. Security element 11 comprises as plurality of apertures through the sheet document 10 arranged so as to form a perforated image, here the code "H3456792". This is referred to as a 'perforated image' since it arises solely from the configuration of apertures and not any printing step. The document 10 has then been subjected to printing in the vicinity of the perforated image, which will be described in more detail below.

The perforated image itself could take any desirable form: numerical, text, symbolic or otherwise. It will be appreciated that any number of apertures may be used to form the desired perforated image, and the apertures may be of any suitable shape. A single aperture could be used if desired although in general an array of apertures (such as that depicted) is preferred as this increases the complexity of the security element 11.

In FIG. 2, the digits "567" are shown enlarged for clarity. It will be seen that each digit is made up of a series of approximately circular apertures. Each has a diameter of around 0.5 to 1 mm. The digit "5" comprises thirteen apertures 12, of which the first three are labelled 12*a*, 12*b* and 12*c*. The digit "6" is made up of twelve apertures 13, of which only two 13*a* and 13*b* are labelled. The digit "7" is made up of nine apertures 14, of which the first three are labelled 14*a*, 14*b* and 14*c*. Two of the apertures 12*d* and 12*e* of the digit "5" are shown at greater magnification. Each of the apertures 12*d* and 12*e* is approximately circular, though the edges appear rough, which is a characteristic of laser perforation. In this embodiment, the printing of the perforated document results in the appearance of rings 12' around each aperture. This is due to the deposit of ink of interior surfaces of the apertures during printing.

Figure 3A:
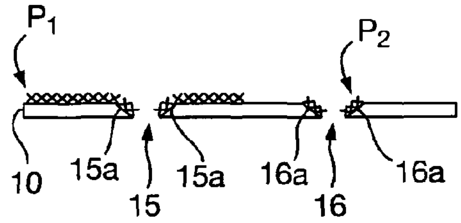

FIG. 3 shows this in more detail. The precise geometry of each aperture will depend on the manner in which it is formed. FIG. 3*a*, for example, shows a cross-section through the security element on document 10 depicting apertures 15 and 16, which have each been formed by laser perforation. Depending on the thickness of the document and the laser parameters, the profile of each aperture may vary but in general the aperture has a conical shape with a cross-section at the upper surface which is greater than that at the lower surface of the document (further from the laser beam source). The cross-sectional area of the aperture decreases with depth through the document. For instance, at the top surface the diameter of the aperture may be 1 to 2 mm whereas at the lower surface the diameter is reduced to around 0.5 mm. The interior surface of the aperture 15 is formed by conical wall 15*a* and that of aperture 16 likewise by conical wall 16*a*. When printing takes place through the apertures, ink is deposited on the interior surfaces of each aperture as indicated by print areas $P_1$ and $P_2$. Depending on the effect desired, the ink may be confined to the interior surfaces of the apertures (as in the case of aperture 16) or may additionally cover an area of the face of the document, as is the case surrounding aperture 15.

Figure 3B:
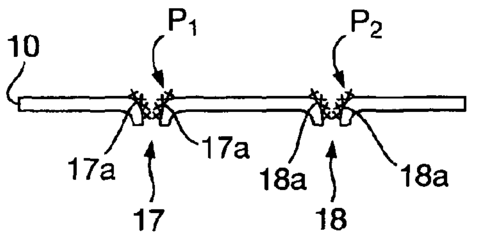

Similar results are achieved where the perforations are formed using other means. For example, FIG. 3*b* shows two apertures 17 and 18 which have been formed mechanically, for example by puncturing the document 10 with pins. Typically, mechanical perforation results in some distortion of the document around each aperture, as depicted in exaggerated form in FIG. 2*b*. The curvature of the document in the region of each apertures leads to the aperture having a funnel-like shape with an initial conical section flattening out into a cylindrical portion which has substantially parallel sides. On printing through the perforations, ink is once again deposited on to the internal surfaces of the apertures, as designated by $P_1$ and $P_2$. In the example shown, ink has been deposited only in the vicinity of the apertures 17 and 18 and not substantially on the face surface of the document.

Where mechanical pins are used to make the perforations, it is possible to combine the perforation and printing into a single step. By coating the outer surface of each of the or each pin with the desired ink, ink can be transferred onto the internal surfaces of the or each aperture as the aperture is formed.

Any other perforation techniques could alternatively be used, including rotary perforation, in which apertures are formed by grinding regions of a document between selectively patterned abrasive rollers.

Whilst the geometry of the aperture influences the amount of ink deposited on the interior surface and its visibility to an observer, in practice it is found that even where the interior surfaces are substantially perpendicular to the surface of the document, ink is still deposited thereon during printing (assuming the printer is controlled to deposit ink across the edge of the aperture). This may be due to absorption of the ink by the material forming the document 10 and/or the ink movement not being entirely parallel to the internal walls.

Printing on the interior surfaces of perforations in this way leads to a number of possibilities for authentication. In a first example, the very presence (or absence) of ink on the internal surfaces can be used to determine whether a document is genuine. For instance, where printing is performed only on the internal surfaces of the or each aperture, the ink is not immediately obvious to an observer (even if it is printed in a visible colour). Nonetheless, close inspection will reveal whether the ink is indeed present on the internal surfaces where intended (and in the correct colours—visible or otherwise) and so provides an indication as to whether or not the document is genuine. Similarly, if a print is provided over more of the document's face surface, including one or more apertures, inspection of the internal surfaces of the apertures will reveal whether the print was made before or after the perforations. If ink is found to be present on the internal surfaces of the apertures, this can be taken as an indication that the document is genuine. If not, this suggests that the perforations were formed after the print was applied (as is the conventional technique), in which case the internal surfaces of the apertures will be freshly "cut" and the ink will not be continuous between the print on the face of the document and that on the internal surfaces.

The manner in which one or more of the perforations are inked can be varied as desired in order to encode additional information into the element. It will be appreciated that any one or more of the apertures could be printed; ink need not be applied to the entire aperture array. Neither is it necessary to deposit ink on to the whole of the interior surface of any one aperture; partial coverage may be appropriate. Typically, the colour, intensity and/or type of ink may be varied between the apertures or even within one aperture. Thus, complex security elements can be formed which are correspondingly difficult to counterfeit.

The extent to which the ink on the internal surfaces is readily apparent to an observer will depend on the nature of the print (e.g. the colour) and on the aperture geometry. If the aperture is conical (or pyramidal or any other shape with a decreasing cross-section), the ink on the internal surfaces will be more readily apparent from a normal viewing position, since the internal surfaces are angled towards the viewer. This effect will become more significant as the slope of the interior surface increases away from the perpendicular. In contrast, an aperture with substantially perpendicular sides will largely conceal the ink deposited thereon to a viewer observing the document from the normal.

It should be noted that, whilst referring above to a "viewer" or an "observer", it is not necessarily the case that the ink need be observable to the human eye. The ink may instead be detectable outside the visible spectrum. In addition, the size of the apertures may be such that magnification may be required before the deposited ink on the internal surfaces will be apparent.

Where the internal walls of the aperture are close to parallel (e.g. each passes substantially perpendicularly through the document) the ink deposited thereon can be viewed more readily when the aperture is observed at an acute angle.

This not only helps to conceal the presence of the ink from the casual observer but also leads to an enhanced visual effect (since more of each aperture's internal surface becomes visible when viewed at an angle), which aids identification of the security element. Further advantages of this will be discussed below.

FIGS. **4*a* and 4*b* show a security element applied to a multi-layer security document 20 according to a second embodiment of the invention. In this example, the security document 20 comprises a plurality of pages 21 of a booklet document, such as a passport. Only a portion of those pages 21 forming the part of the document 20 to which the security element is to be applied are shown, but the document may typically also include additional pages and/or cover pages joined as described above by a spine (not shown). In this example, two apertures are depicted, 22 and 23. As described above, the apertures can be formed by any desirable technique such as laser perforation. Each aperture 22, 23 has a conical shape and is defined by internal surfaces 22*a* and 23*a* respectively. Each internal surface 22*a*, 23*a* is formed of the edges of the pages 21, so each of the pages 21** (or at least some of them) receives ink on its cut edge. In this example, the ink is shown not to reach through the whole depth of the apertures. This may be by design or due to the apertures' geometry.

FIG. **4*a* shows all of the pages 21 "closed" (i.e. arranged with their faces in contact with one another). Aperture 22 has been printed with ink $P_1$ only in the vicinity of the aperture, such that ink is deposited only onto the internal surfaces and not substantially onto the face of uppermost page 21*a*. This can be achieved through control of the printer. Aperture 23 on the other hand has been more extensively printed with ink $P_2$ which additionally extends over a region on the face of the uppermost page 21*a*** either side of the aperture. This may take the form of any desired image on the face of the page.

In use, the various pages 21 of the document 20 can be separated, and FIG. **4*b* shows the uppermost page 21*a* opened away from the remaining pages. When the new uppermost page 21*b* is inspected, ink is found to be present only on the interior surfaces of the apertures 22 and 23, and not on the face surface of the page 21*b*, since it has been shielded during printing by the original uppermost page 21*a***. This technique provides a particularly convenient method of arriving at the presence of ink only on interior surfaces and not on face surfaces of the document since control of the printer is less crucial. The same technique can be implemented using a mask between the security document and the printer during manufacture, such that even the uppermost surface of the original document is shielded. This is of course applicable to any type of security document and not solely multi-layer implementations.

Figure 4A:
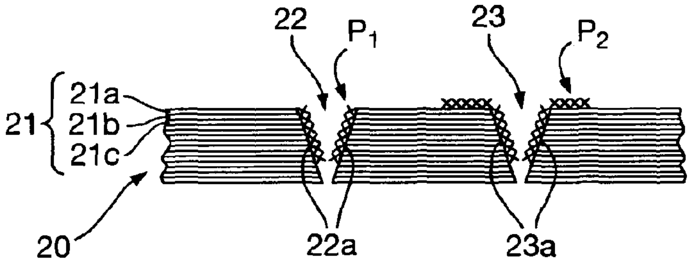
Figure 4B:
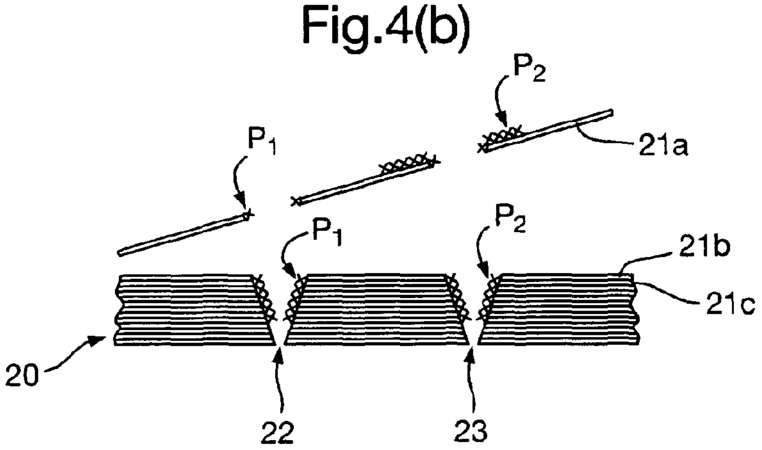

In multi-layer documents, however, the presence (or absence) of the ink on the interior surfaces of the apertures can additionally be used to deduce whether any of the layers making up the document (in this case pages 21) have been substituted. If so, this will be apparent on inspection, since one or more of the pages will not exhibit ink on its interior surface which is continuous with that of the adjacent (non-substituted) layers. For example, if the document shown in FIG. 4*b* has its uppermost page 21*a* removed and substituted, the absence of ink $P_1$ on the replacement page will be notable when compared with the remainder of print $P_1$ on the lower pages. Similarly, although a counterfeiter may be aware of the image formed on the face of page 21*a* by print $P_2$, he would likely attempt to forge such a page by printing and then perforating the document. As such, the absence of ink $P_2$ on the interior surface of aperture 23 in the replacement page 21*a* will be notable.

Figure 5:
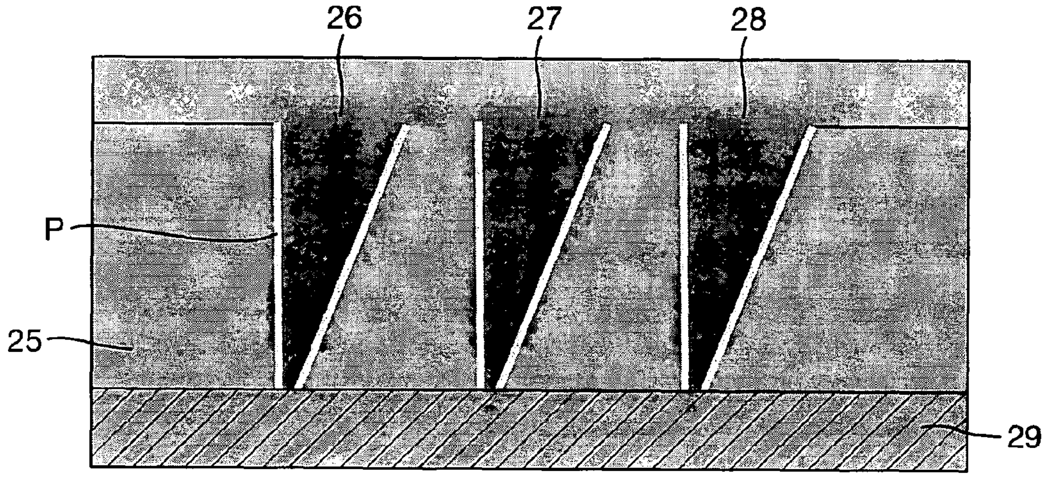
FIG. 5 is a magnified image showing a cross-section through a security element made according to a third embodiment.

FIG. 5 shows a cross-section through a document to which a security element according to a third embodiment has been applied in much the same manner as described above. Here, three apertures 26, 27 and 28 through a multi-layer document 25 are shown at high magnification, such that the edges of the sheets making up the document 25 are visible. The applied ink is designated by white regions labelled P. This example also shows a second portion 29 of the same security document 25, such as an outer cover of a booklet document or a further layer of a laminate card. The apertures 26, 27 and 28 have been formed and printing has taken place with the multi-layer section 25 separate from the second portion 29 (e.g. with the security booklet opened or prior to bonding layer 29 in the case of a laminate card), such that ink is not additionally present on the interface between the first and second portions of the document.

Figure 6:
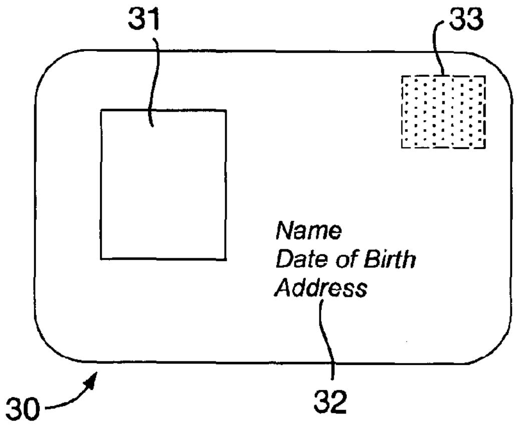
FIG. 6 depicts a security element made according to a fourth embodiment and applied to a card.

FIG. 6 shows a security element 33 according to a fourth embodiment and applied to a laminate card, such as an ID card or driver's license. The card 30 may be formed of one or more layers such as paper or plastic materials. In this example, data such as photograph 31 of the holder and bibliographic information 32 is printed or otherwise inscribed on the card as shown. The security element 33 is provided adjacent one corner of the card although it could take any desirable position and could cover the whole surface of the card if preferred.

Security element 33 comprises a grid of apertures as shown best in FIG. 7*a*. In this example, the grid comprises forty apertures of which the first three 34*a*, 34*b* and 34*c* are labelled in FIG. 7*a*. Each aperture is approximately the same size and shape, and the spacing between the apertures (indicated as $S_1$ and $S_2$) is approximately constant. For example, the diameter of each aperture may be around 0.5 mm, and the spacing $S_1$ and $S_2$ may be around 2 mm. The geometry of each aperture is similar that shown in the preceding embodiments, but in this case it is desirable for the interior surfaces of each aperture to be near parallel. Selected apertures 34 have been subjected to printing such that ink is deposited on their interior surfaces. The selected subset of printed apertures may include any or all of the apertures 34. Due to the geometry of the apertures, the printing is not readily apparent when the security element 33 is viewed from the normal, as depicted in FIG. 7*a*. However, when viewed from an acute angle (i.e. at less than 90°), a latent image 35 is revealed as depicted in FIG. 7*b*. The latent image 35 is made up of the printed subset of apertures which in this case consist of nine apertures selected so as to form the numeral "10". In the Figure, only the first three printed apertures 35*a*, 35*b* and 35*c* are labelled for clarity. By viewing the security element 33 at an acute angle, the effect of the printed internal surfaces is enhanced, which causes the selected apertures to stand out against the unprinted remainder of the grid so as to provide an easily recognisable display. Of course, if preferred, the printed apertures 35 could act as a background to the latent image with unprinted apertures forming the foreground (i.e. digit "10" in this example).

The printed apertures 35*a*, 35*b*, 35*c* etc, could all be printed with an ink of even colour, or the applied colour may vary between apertures or within one aperture so as to increase the complexity of the latent image. Ink variation may also be used itself to form a latent image, rather than the selection of only certain apertures to be printed. For instance, all of the apertures 34 may be printed, with the colour or intensity (for example) of the deposited ink being varied across the grid so as to form an image when viewed at an angle. For instance, in FIG. 7*b*, each of the so-far unprinted apertures 34*a*, 34*b* and 34*c* etc. could be printed with a background colour ink, and the apertures forming a latent image 35 with a different colour ink so that the image 35 becomes apparent. Of course, in all these examples, the "colour" of the ink need not be visible.

Latent images can be provided in this way for any array of apertures; the implementation is not limited to the use of a grid. For example, in the first, second and third embodiments, the perforated image could be printed with a pattern of colours, for example, which becomes apparent upon viewing the element at an acute angle, in the manner presently described.

FIG. 8 shows a security document to which a security element according to a fifth embodiment of the invention has been applied. Here, the security document is a security booklet 40, such as a passport booklet, having a front cover 41, a back cover 42 and a plurality of internal pages 43, of which four 43*a*, 43*b*, 43*c* and 43*d* are depicted. In practice, passport booklets can have any number of internal pages (commonly termed "visa pages") and typical examples include 32 pages. Only a first part 45 of the security element is visible in FIG. 8.

The security element comprises a set of perforations 45 provided through a first portion of the document, namely internal pages 43, and a print 46 which is deposited on a second portion of the security document, here the inner surface of the rear cover 42 of the booklet. The print 46 has been formed by printing through the perforations 45, as described above with reference to FIG. 1, with pages 43 taking the place of document portion 1, and rear cover 42 that of surface 2.

FIG. 9 shows a portion of the booklet 40 in more detail in plan view. Here it is apparent that the perforations 45 provided through internal pages 43 take the form of a code "P123457" which, in this example, is a passport serial number. The perforations have been formed in much the same way as described with respect of the first, second and third embodiments above: for example, by laser perforation, mechanical pins or otherwise. In this example, the perforations pass through all four internal sheets of the security booklet, which are therefore jointly referred to as the first portion 43 of the document. However, in other examples, the first portion could be formed by any subset of the pages. For example, end sheet 43*d* may alone be perforated and so form the first portion of the document. Similarly, the second portion of the document (here the inside of rear cover 42) could comprise any other suitable surface within the document. For example, if internal sheets 43*a*, 43*b* and 43*c* are jointly perforated to form the first portion of the document, then the end page 43*d* may provide the second portion of the document.

During printing, the document 40 is arranged in a reference position, with the first and second portions of the document in known positional relation to one another. In the present example, this is achieved by holding all of the internal pages 43 flat against rear cover 42 (whilst front cover 41 is held open). On printing, ink passes through the array of apertures 45 and deposits a corresponding array of inked areas 46 onto the surface of the second portion of the document 42. This is depicted in FIG. 10, which shows the relevant portion of the inner surface of cover 42. In this example, the surface 42 has an existing security print (including a boat and background motifs). Only a selection of the inked regions 46 are readily apparent in FIG. 10, since the remainder overlap with the security print and are not immediately visible in black and white. However, in practice, appropriate colours of ink can be selected such that all inked regions are observable, if desired. It should be noted that, in this example, during the printing process there is no requirement for any ink to be deposited on the interior surfaces of the apertures (or elsewhere on the first portion 43) which may be achieved by appropriate control of the printer, or a mask.

Since the inked regions 46 have been deposited through the apertures 45, the ink on cover 42 is precisely aligned with the apertures 45. FIG. 11*a* shows an enlarged area of the security element in plan view, with the booklet held with at least one of the perforated pages 43 against the rear cover 42. Three exemplary apertures 45*a*, 45*b* and 45*c* (making up part of the digit "2") are shown. Inspection of the apertures will show that corresponding inked region 46*a*, 46*b* and 46*c* are visible through the apertures 45*a*, 45*b* and 45*c*. In a genuine document, the inked regions 46 will be in precise register with the apertures 45, as depicted in FIGS. 11*a* and 11*b*. FIG. 11*b* shows a cross-section through the security element showing the alignment between apertures 45*a* and 45*b* through the internal pages 43 (here shown as a monolithic block for clarity) and the inked regions 46*a* and 46*b* on the internal surface of rear cover 42. It will be seen that the edges of the inked regions 46*a* and 46*b* correspond precisely with the periphery of each aperture 45.

It is extremely difficult to reverse engineer this effect. If a counterfeiter were to attempt to substitute either the internal pages 43 or the rear cover 42 of the booklet, it would not only be necessary for the substituted portions to be provided with either perforations or inked regions as appropriate (to replace those removed), but also to position each correctly. In doing so, it will be near impossible to achieve the level of alignment between the apertures 45 and inked regions 46 expected of the security element. To illustrate this, FIGS. 12*a* and 12*b* show a plan view and cross-section of portions of a fraudulent document corresponding to the portions of the genuine document shown in FIG. 11. Here, the apertures 45*a*, 45*b* and 45*c* appear misaligned with the corresponding inked regions 46*a*, 46*b* and 46*c*, which is made particularly evident by the appearance of the edge 46*a*', 46*b*' and 46*c*' of each corresponding inked region within the aperture. A non-inked region will also be visible between the edge of the inked region 46 and the periphery of the aperture 45 in each case. Thus, simple comparison of the inked regions with the apertures in this way can reveal whether the document is genuine.

As in the previous embodiment, the complexity of the security element can be enhanced by varying the colour or other optical characteristic of the ink used to print the inked regions 46. Thus, the counterfeiter must not only achieve alignment but also exact replication of the necessary ink type(s) for each individual ink region. The security of the element is further enhanced if, as in this example, the inked region 46 is provided on an already printed portion of the document (such as over the security print shown in FIG. 10), since this may at least partially conceal the existence of inked regions 46 from the casual observer.

FIG. 13 shows a security element made according to a sixth embodiment of the invention which has been applied to a security booklet 50. The security booklet 50 is of a similar construction to booklet 40 shown in FIG. 8 with internal pages 51 providing a first portion of the security document and the internal surface of a cover page 52 providing a second. Again, as in the case of the fifth embodiment, either portion of the document may be made up of more than one layer.

An array of apertures 53 is provided through the internal pages 51 of the booklet. Here, the array of apertures comprises a large star-shaped centre aperture 53*c* surrounded by a series of smaller, circular apertures arranged so as to form a concentric star-shaped outline. Only three of these circular apertures 53*a*, 53*b* and 53*d* are individually labelled, for clarity. The circular aperture 53*a, b, d* etc, may have a diameter of around 1 mm, and the star-shaped aperture a height of around 5 mm. As in the case of the fifth embodiment, the document has been printed such that inked regions 56 corresponding to some of the apertures 53 are present on the surface of cover 52. However, in this example, the printing step has deposited ink onto the first portion 51 of the document in addition to the second portion 52. This is depicted by shaded area 54 shown in the plan view of FIG. 13, as well as by the shadowed apertures including 53*a* and 53*d* (un-shadowed apertures such as 53*b*, in contrast, have not been printed). In this example, the uppermost internal page 51 is printed on its face surface in the region 54, whilst selected apertures have ink deposited on their internal surfaces (only) as described in the first, second, third and fourth embodiments. All of the apertures including 53*d* which fall within printed area 54 have deposited ink on their internal surfaces by virtue of the overprinting. Selected apertures including 53 outside region 54 have also been printed but here the printing has been localised to the internal surfaces only.

FIG. 14 shows a cross section through selected apertures of the security element shown in FIG. 13, specifically apertures 53*a*, 53*c* and 53*d*. It will be seen that ink layer 54 is substantially continuous over the face surface and interior surfaces of the first portion of the document 51 in the region of apertures 53*c* and 53*d*, with corresponding inked regions on the surface of the second portion of the document 52, labelled 56*c* and 56*d*. The ink deposited onto the internal surfaces of each aperture is designated 54*c* and 54*d* respectively. The internal surfaces of aperture 53*a* are deposited with ink 55, which may be the same in appearance as print 54 or not. Corresponding inked area 56*a* is deposited onto the surface of the second portion of the document 52.

Thus, the printed image (consisting of partial circle 54 plus circular dots corresponding to the positions of the shadowed apertures) which has been laid down in the printing step is divided into two portions: a first deposited on the first portion of the document 51, and a second on the second portion of the document 52. Comparison of the first and second portions of the document 50 can then be used in a similar way to that described above to determine whether the document is genuine. Inspection of the inked areas 56 (i.e. the second portion of the printed image) through the apertures 53 will reveal the ink that is continuous with that deposited on the first portion of the document 51 (the first portion of the image) if the document is genuine. That is, inked region 56*a* will be aligned with aperture 53*a* and will match the optical characteristics of ink 55, inked region 56*c* will be aligned with aperture 53*c* and match the optical characteristics of ink 54 in that region, and inked region 56*d* will align with aperture 53*d* and match the optical characteristics of ink 54 in that region. Thus, the type of ink forming the printed image can be more readily tested for authenticity in this embodiment than the last, since the ink on one portion of the document can be compared directly with that on the other portion, removing the need for any external reference.

As in the case of the fifth embodiment, if one or the other portion of the document is substituted, this will be revealed by misalignment between the printed regions 56 on the second portion of the document and the apertures 53.

FIG. 15 shows the aperture 53*c* in plan view in a counterfeit document, from which it is clear that the boundary of the printed area 54 on the first portion of the document 51 does not align with that of the corresponding printed region 56*c* on the second portion of the document. It will further be apparent that the inked regions of the internal surfaces 54*c* do not correspond with the inked region 56*c*. Thus substitution of one of the portions of the document will be readily detected. It will of course be appreciated that, instead of utilising a boundary between printed and non-printed regions to detect misalignment in this way, variation in ink type could be used instead. For example, misalignment of a boundary between two colours would be equally noticeable, as would that of a gradual colour change.

Implementations such as that shown in FIGS. 13 to 15 additionally provide the advantages described above with respect to the second and third embodiments since, where the first portion of the document is made up of multiple pages, the continuity of the ink deposited on the internal surfaces of the apertures can be used to determine whether any of these pages have been substituted also. Latent images such as those described with respect to the fourth embodiment can also be formed if desired.

FIG. 16 shows a further security element 68 applied to a security booklet 60 in accordance with a seventh embodiment. The security booklet 60 is of a similar construction to that shown in FIG. 8, having front and rear covers 61 and 63 joined at a spine 62, and internal pages of which two, 64 and 65, are depicted. Any further internal pages of the booklet will be positioned between page 65 shown and front cover 61. Page 64 shown is an end page, sitting adjacent to the rear cover 63, and is used to provide personalisation information relating to the holder of the passport. Typically, this includes machine-readable information 66 as well as bibliographic information 67, and a photograph of the holder. Here, the conventional photograph has been replaced by the security element 68. As shown in FIG. 16, security element 68 comprises a grid of apertures passing through the page 64, which here constitutes the first portion of the document. In this example, each aperture is approximately square and will have the same size and spacing. For example, the apertures may each be 1 $mm^2$, and the spacing between each may be around 1 mm. A particularly suitable technique for producing such an array of perforations is by means of rotary grinding. As shown in FIG. 16, the page 64 is pre-printed with a security print.

With the page 64 held against the rear cover 63 (i.e. in a reference configuration), the grid of apertures 68 is printed with a photograph of the holder, although any other image could be used. Due to the presence of the apertures, a first portion of the image is deposited onto page 64 and the remainder of the image (a second portion) will pass through the apertures to be deposited onto the surface of rear cover 63.

FIG. 17*a* shows the first portion 70 of the image deposited onto page 64, and FIG. 17*b* shows the second portion 71 of the image which has passed through apertures 68 to be deposited onto the inner surface of the rear cover 63. It will be noted that the inked regions making up the second portion 71 of the image correspond in size and location to the apertures 68 provided in page 64. In this example, the second portion 71 of the image appears as a "ghost" image on the second portion of the document, i.e. being of lesser intensity than the first portion of the image. However, the relative intensity of the two portions of the image can be varied as desired by adjusting the size and spacing of the apertures 68.

In a genuine security document formed in this way, the two portions 70 and 71 of the image printed through apertures 68 will align exactly with one another. As such, when viewed together, the two partial images 70 and 71 will visually combine to form a whole. In a genuine document, the reconstituted image will have a consistent appearance, since each of the inked portions deposited onto the second portion of the document 63 through the apertures 68 will align precisely with and "fill" each of the gaps in the first partial image 70, left by aperture 68. The resulting recombined image will therefore have the appearance of having been printed onto a single continuous surface. If substitution of either the page 64 or the rear cover 63 is attempted, even a small amount of misalignment between the first and second portions of the image will be noticeable to an observer, since the reconstituted image will not have the expected appearance. This is particularly so where the image is a photograph, due to the high amount of detail included.

A security element made according to an eighth embodiment of the invention applied to a flexible sheet document such as a banknote is depicted in FIG. 18. Here, banknote 80 is provided with an array of apertures 81 arranged in a 'zig-zag' pattern in a first portion of the document adjacent to its left hand side, and with corresponding inked regions 82 in a second portion of the document, adjacent to the right hand side. The inked regions 82 have been formed by printing through the apertures 81. FIG. 19 shows a cross-section through banknote 80 along the line X-X'.

In this example, six substantially square apertures are provided, labelled here 81*a*, 81*b* . . . 81*n*. The apertures can be manufactured using any desired process including laser perforation, mechanical perforation or rotary perforation as described above. Before printing, the banknote 80 is folded about axis A-A' which brings its corners into registration with one another, as depicted in the cross-section of FIG. 20, which shows a single aperture 81*n* and corresponding inked region 82*n* for clarity. Printing takes place through aperture 81*n* as described above with reference to FIG. 1. In the example shown, no ink is deposited on the first portion of the document inside or around the apertures, although in other cases it may be preferable to deposit ink onto the internal surfaces of the aperture 81*n* and/or onto the face of the banknote for easy reference with printed area 82*n* (as described above with reference to embodiments six and seven).

The authenticity of the document can be readily checked by returning the document into the same reference position with the corners aligned, and confirming that the inked areas 82 are in registration with corresponding apertures 81.

Other reference positions may be made use of if desired. For example, FIG. 18 additionally shows marks 84*a* and 84*b* provided on the surface of the banknote. These could be designated features forming part of an existing security print, if desired, so that the marks are not overtly conspicuous, or could be applied separately. Folding banknote 80 such that point 84*a* meets point 84*b* causes folding along axis B-B'. Printing through apertures 81 in this position leads to deposition of ink in the region of block 83*b* corresponding to aperture 81*b* (only one such ink block is shown for clarity). Different fold axes can be designated for different types of notes (or even each individual note), thereby further enhancing the difficulty of forging.

FIGS. 21*a*, 21*b* and 21*c* show a ninth embodiment in which a security element is applied to a laminate document 90, such as a multi-laminate banknote, ID card, driving licence or bank card. Here, the document has at least two layers 91 and 92 which are not designed to be separated in use, but in practice might be delaminated by a determined forger. The layer 91 is itself made up of multiple sub-layers 91*a*, 91*b* and 91*c*, although this need not be the case. Layer 91 has been perforated and two exemplary apertures 91*a* and 91*b* are shown. Perforation could take place before or after layer 91 is joined to layer 92. For example, the layer 91 could be perforated by any desirable technique (laser, mechanical or otherwise) and then bonded to layer 92. Alternatively, perforation could be carried out after bonding, by drilling to the desired depth or forming layer 92 of a laser transparent material such that it will not be affected by a laser used to perforate layer 91.

After lamination of layer 91 to layer 92, the apertures are printed with ink P. In this example, the ink P forms an image on the face surface of layer 91 as well as being deposited on the internal surfaces of the apertures 93*a* and 93*b* and forming inked regions 94*a* and 94*b* on the second portion 92 of the document. Of course, as mentioned in other embodiments, this need not be the case.

If a counterfeiter now attempts to remove layer 92 (for example to gain access to personalisation information thereon) the inked regions 94*a* and 94*b* are separated from their respective apertures, as shown in FIG. 21*b*. On replacing the layer 92, as shown in FIG. 21*c*, it is very difficult for a counterfeiter to achieve the correct alignment and as such this will be observable upon inspection of the apertures.

In each of the examples given above, the optical characteristics such as colour and intensity of the deposited ink may be selected as desired. Any suitable ink may be used, including visible and non-visible "colours", and inks with both visible and non-visible components. Security inks such as those containing luminescent, phosphorescent, fluorescent, thermochromic, photochromic or optically variable substances provide particular benefits since their optical effect may not be immediately apparent to the viewer and are also more difficult for a counterfeiter to reproduce.

The deposited ink could be of a single consistent type across the whole security element, or could be applied randomly (i.e. in a random pattern of colours). Alternatively, the colours of the ink may be deposited according to a "template" which does not itself convey data but acts simply as an additional authentication means. For example, a plurality of different possible templates may be made available (e.g. vertical "rainbow" stripes and horizontal "rainbow" stripes), the presence of the correct colour template being used to help determine the document's authenticity. In particularly preferred embodiments, it is advantageous for the colour "template" used (even where this is constant or has been randomly generated) to be recorded against the document in a database so that when examining the document for authenticity, the intended type of ink or inks which should be found on the security element are known. For example, details of the chosen colour template may be stored in a database alongside other details of the document (such as its serial number and/or owner), which can be retrieved when the document's authenticity needs to be tested.

It may further be desirable to encode additional data into the document using the optical characteristics of the ink. Such data may be intelligible to a human observer or not. For example, an arrangement of colours forming an image such as a pattern or graphic or code which is recognisable to a human may be preferred.

Alternatively, the arrangement of colours can carry coded data. For example, the colour template could be generated using an algorithm based on the perforated image or on information such as the document serial number or bibliographic data of the document holder. For instance, in the embodiment shown in FIG. 2, each of the letters or digits of the perforated image could be printed with a colour chosen according to the value of the letter or digit. For example, the letter "H" being printed in red, the digit "3" being printed in blue, the digit "4" being printed in yellow, the digit "5" in green, etc. Further documents of the same series provided with different perforated codes would have different colour templates based on the content of their codes. For example, a document having a perforated code "H53426792" would have its first letter "H" printed with red ink, its first digit "5" printed in green, its second digit "3" in blue, its third digit "4" printed in yellow. Thus it would be necessary for a counterfeiter to match the results of the algorithm when selecting ink colours to apply to different perforated codes. Similar algorithms can be based on personalisation information or other data such as denomination of a banknote.

In combination with the benefits of the security elements already described above, colour encoding in this way provides for a particularly high level of authenticity checking.

The invention claimed is:

1. A method of manufacturing a security element for a security document, the method comprising:

providing a first portion of the security document, the first portion of the security document having at least one aperture therethrough, the or each aperture being defined by an internal surface of the first portion of the document; and printing through the first portion of the security document such that ink is deposited onto at least a part of the internal surface of the at least one aperture;

wherein the first portion of the security document comprises multiple layers, the or each aperture passing through all of the layers, the interior surface of the or each aperture comprising edges of the multiple layers and at least some of the edges of the multiple layers receiving ink in the printing step.

2. A method according to claim 1, wherein the deposited ink is observable from a viewing angle normal to the first portion of the security document.

3. A method according to claim 1, wherein the deposited ink is observable from an acute viewing angle.

4. A method according to claim 1 wherein at least a portion of the at least one aperture has a cross-sectional area which decreases with depth of the aperture through the first portion of the security document.

5. A method according to claim 4, wherein the at least a portion of the at least one aperture is substantially conical, frustoconical or pyramidal.

6. A method according to claim 1, wherein the first portion of the security document has an array of apertures therethrough, at least one of the array of apertures having ink deposited onto at least a part of its internal surface in the printing step.

7. A method according to claim 6 wherein the deposited ink is observable from an acute viewing angle and in the printing step, the deposition of ink onto the internal surfaces of the array of apertures is varied such that when the array is viewed at an acute angle, a latent image formed by the deposited ink becomes apparent.

8. A method according to claim 7, wherein, in the printing step, ink is deposited onto at least part of the internal surface of one or more selected aperture(s) forming a subset of the array, such that the selected subset of apertures become apparent relative to the remainder of the array when viewed at an acute angle, thereby forming the latent image.

9. A method according to claim 6, wherein the array of apertures comprises at least two apertures arranged so as to form a perforated image.

10. A method according to claim 9 wherein the perforated image formed by the at least two apertures depicts one or more of: text, numbers, alphanumerical text, symbols, patterns, graphics and photographs.

11. A method according to claim 6, wherein the array of apertures comprises a matrix of at least two apertures, the apertures forming the matrix preferably being of substantially equal size and/or being arranged at a substantially equal spacing from one another.

12. A method according to claim 1, wherein, in the printing step, an optical characteristic of the deposited ink is varied across the internal surface(s) and/or between apertures, the optical characteristic being preferably colour and/or intensity.

13. A method according to claim 12, wherein the first portion of the security document has an array of apertures therethrough, at least one of the array of apertures having ink deposited onto at least a part of its internal surface in the printing step the deposited ink is observable from an acute viewing angle and, in the printing step, the deposition of ink onto the internal surfaces of the array of apertures is varied such that when the array is viewed at an acute angle, a latent image formed by the deposited ink becomes apparent, and the optical characteristic of the deposited ink is varied across the array to form the latent image which becomes apparent when the first portion of the document is viewed at an acute angle.

14. A method according to claim 1 wherein, in the printing step, ink is only deposited onto at least a part of the internal surface of the at least one aperture and not substantially onto any other surface of the first portion of the security document.

15. A method according to claim 1, wherein in the printing step, an outermost layer of the multiple layers masks the remaining layer(s) from receiving ink except in the vicinity of the or each aperture, such that at least one of the multiple layers has ink deposited only on one or more edges forming part of the interior surface of the or each aperture.

16. A method according to claim 1, wherein the or each aperture is formed by one of: laser perforation of the first portion of the security document, mechanical perforation of the first portion of the security document and rotary perforation of the first portion of the security document.

17. A method according to claim 1, wherein the or each aperture is substantially cylindrical, prismatic, conical, frustoconical or pyramidal.

18. A method according to claim 1, wherein the cross section of the or each aperture is substantially circular, square, rectangular, triangular, polygonal or an irregular shape.

19. A method according to claim 1, wherein the cross section of the or each aperture has a dimension of between around 50 microns and 5 mm, preferably between around 50 microns and 2 mm, still preferably between around 50 microns and 1 mm.

20. A method according to claim 1, wherein the method further comprises perforating the first portion of the security document to form the or each aperture therethrough.

21. A method according to claim 1, wherein the printing step comprises inkjet printing, dye sublimation, laser printing, lithographic printing, flexographic printing, intaglio printing, gravure printing, screen printing or letterpress printing.

22. A method according to claim 1, wherein the printing step is carried out simultaneously with perforation of the first portion of the security document, using an ink-laden perforation tool, preferably one or more ink-laden pins.

23. A method according to claim 1, wherein the ink deposited in the printing step comprises any of: visible ink, non-visible ink, UV responsive ink, IR responsive ink, fluorescent ink, luminescent ink, phosphorescent ink, thermochromic ink, photochromic ink and optically variable ink.

24. A method according to claim 1, wherein the document is any of: currency, a banknote, a certificate, a passport booklet, an identification card, a certificate of authentication and a driving licence.

25. A method according to claim 1, wherein the first portion of the security document is pre-printed, prior to performance of the method, preferably with security prints including any of: intaglio prints, guilloches, fine-line prints, and gravure prints.

26. A method of manufacturing a security element for a security document, the method comprising:

providing a first portion of the security document, the first portion of the security document having at least one aperture therethrough, the or each aperture being defined by an internal surface of the first portion of the document; and printing through the first portion of the security document onto a second portion of the security document provided behind the first portion of the security document, such that ink is deposited onto at least a part of the second portion of the security document aligned with the at least one aperture.

27. A method according to claim 26, wherein the first portion of the security document has an array of apertures therethrough, ink being deposited onto the second portion of the security document aligned with a selected subset or all of the array of apertures.

28. A method according to claim 27, wherein the array of apertures comprises at least two apertures arranged so as to form a perforated image.

29. A method according to claim 28 wherein the perforated image formed by the at least two apertures depicts one or more of: text, numbers, alphanumerical text, symbols, patterns, graphics and photographs.

30. A method according to claim 27, wherein the array of apertures comprises a matrix of at least two apertures, the apertures forming the matrix preferably being of substantially equal size and/or being arranged at a substantially equal spacing from one another.

31. A method according to claim 26, wherein, in the printing step, ink is additionally deposited onto at least a part of the first portion of the security document.

32. A method according to claim 31, wherein, in the printing step, ink is additionally deposited onto at least a part of the internal surface of the at least one aperture.

33. A method according to claim 31, wherein the printing step comprises printing an image through the first portion of the security document, such that a first portion of the printed image is deposited on the first portion of the security document, and a second portion of the printed image is deposited on the second portion of the security document, the first and second portions of the printed image being in register with one another.

34. A method according to claim 33, wherein the printed image depicts one or more of: text, numbers, alphanumerical text, symbols, patterns, graphics and photographs.

35. A method according to claim 26, wherein the first and second portions of the security document are connected in a manner permitting movement relative to one another into and out of a reference configuration, and the method further comprises holding the first and second portions of the security document in the reference configuration during the printing step, the ink deposited onto the second portion of the document being aligned with the or each aperture when the first and second portions of the security document are in the reference configuration.

36. A method according to claim 26, wherein the security document comprises a booklet having multiple pages bound by a spine, the first portion of the security document comprising at least one first page of the booklet, and the second portion of the security document comprising at least one second page of the booklet, the at least one first page and the at least one second page being adjacent one another within the booklet.

37. A method according to claim 36 wherein the first portion of the security document comprises a plurality of first pages of the booklet.

38. A method according to claim 36 further comprising holding the at least one first page of the booklet closed against the at least one second page of the booklet during the printing step.

39. A method according to claim 26, wherein the security document comprises a flexible sheet document, the first and second portions of the security document being provided on the flexible sheet document, and spaced such that the second portion of the security document can be positioned behind the first portion of the security document by manipulating the flexible sheet document.

40. A method according to claim 39 further comprising folding the flexible sheet document so as to position the second portion of the security document behind the first portion of the security document prior to the printing step.

41. A method according to claim 26, wherein the security document comprises a laminate structure of multiple layers, the first portion of the security document comprising at least one first layer of the laminate structure, and the second portion of the security document comprising at least one second layer of the laminate structure.

42. A method according to claim 41, further comprising bonding the at least one first layer of the laminate structure to the at least one second layer of the laminate structure prior to the printing step.

43. A method according to claim 26, wherein the or each aperture is formed by one of: laser perforation of the first portion of the security document, mechanical perforation of the first portion of the security document, and rotary perforation of the first portion of the security document.

44. A method according claim 26, wherein the or each aperture is substantially cylindrical, prismatic, conical, frustoconical or pyramidal.

45. A method according to claim 26, wherein the cross section of the or each aperture is substantially circular, square, rectangular, triangular, polygonal or an irregular shape.

46. A method according to claim 26, wherein the cross section of the or each aperture has a dimension of between around 50 microns and 5 mm.

47. A method according to claim 26, wherein the method further comprises perforating the first portion of the security document to form the or each aperture therethrough.

48. A method according to claim 26, wherein the printing step comprises inkjet printing, dye sublimation, laser printing, lithographic printing, flexographic printing, intaglio printing, gravure printing, screen printing or letterpress printing.

49. A method according to claim 26, wherein the printing step is carried out simultaneously with perforation of the first portion of the security document, using an ink-laden perforation tool, preferably one or more ink-laden pins.

50. A method according to claim 26, wherein the ink deposited in the printing step comprises any of: visible ink, non-visible ink, UV responsive ink, IR responsive ink, fluorescent ink, luminescent ink, phosphorescent ink, thermochromic ink, photochromic ink and optically variable ink.

51. A method according to claim 26, wherein the document is any of: currency, a banknote, a certificate, a passport booklet, an identification card, a certificate of authentication and a driving licence.

52. A method according to claim 26, wherein the first and/or second portions of the security document are preprinted, prior to performance of the method, preferably with security prints including any of intaglio prints, guilloches, fine-line prints, and gravure prints.

53. A method according to claim 26, wherein the cross section of the or each aperture has a dimension between around 50 microns and 2 mm.

54. A method according to claim 26, wherein the cross section of the or each aperture has a dimension of between around 50 microns and 1 mm.

55. A security element for a security document, the security element comprising at least one aperture provided through a first portion of the security document, the or each aperture being defined by an internal surface of the first portion of the document, and ink deposited on at least a part of the internal surface of the at least one aperture, wherein the first portion of the security document comprises multiple layers, the or each aperture passing through all of the layers, the interior surface of the or each aperture comprising edges of the multiple layers and at least some of the edges of the multiple layers carrying the deposited ink.

56. A security element according to claim 55, wherein an array of apertures are provided through the first portion of the security document, at least one of the apertures having ink deposited onto at least a part of the internal surface thereof, and the deposition of ink onto the internal surfaces of the array of apertures varying across the array such that when the array is viewed at an acute angle, a latent image formed by the deposited ink becomes apparent.

57. A security element according to claim 56, wherein one or more selected aperture(s) forming a subset of the array has ink deposited onto at least part of the internal surface(s) thereof, such that the selected subset of apertures become apparent relative to the remainder of the array when viewed at an acute angle, to thereby reveal the latent image.

58. A security element according to claim 56, wherein an optical characteristic of the deposited ink varies across the internal surface(s) and/or between apertures, the optical characteristic being preferably colour and/or intensity.

59. A security element according to claim 58, wherein the optical characteristic of the deposited ink varies across the array to form the latent image which becomes apparent when the first portion of the document is viewed at an acute angle.

60. A security element according to claim 55, the ink having been deposited simultaneously with or after formation of the aperture.

61. A security element according to claim 55, manufactured using a method comprising of:

providing a first portion of the security document, the first portion of the security document having at least one aperture therethrough, the or each aperture being defined by an internal surface of the first portion of the document; and printing through the first portion of the security document such that ink is deposited onto at least a part of the internal surface of the at least one aperture;

wherein the first portion of the security document comprises multiple layers, the or each aperture passing through all of the layers, the interior surface of the or each aperture comprising edges of the multiple layers and at least some of the edges of the multiple layers receiving ink in the printing step.

62. A security element according to claim 55, manufactured using a method comprising:

providing a first portion of the security document, the first portion of the security document having at least one aperture therethrough, the or each aperture being defined by an internal surface of the first portion of the document; and printing through the first portion of the security document onto a second portion of the security document provided behind the first portion of the security document, such that ink is deposited onto at least a part of the second portion of the security document aligned with the at least one aperture, wherein the first portion of the security document has an array of apertures therethrough, ink being deposited onto the second portion of the security document aligned with a selected subset or all of the array of apertures, and the array of apertures comprises at least two apertures arranged so as to form a perforated image.

63. A security document comprising at least one security element in accordance with claim 55.

64. A security document according to claim 63, wherein the security document is any of: currency, a banknote, a certificate, a passport booklet, an identification card, a certificate of authentication and a driving licence.

65. A security element for a security document, the security element comprising at least one aperture provided through a first portion of the security document, the or each aperture being defined by an internal surface of the first portion of the document, and a print provided on a second portion of the security document, the print covering at least a part of the second portion of the security document aligned with the at least one aperture, and the print being in register with the at least one aperture, the print having been applied to the second portion of the security document through the at least one aperture such that ink is additionally carried by at least a part of the internal surface of the at least one aperture.

66. A security element according to claim 65, wherein the print provided on the second portion of the security document forms a second portion of a printed image, a first portion of the printed image being provided on the first portion of the security document, and the first and second portions of the printed image being in register with one another.

67. A security element according to claim 66, the first and second portions of the printed image having been formed in one printing operation, the second portion of the printed image having been applied to the second portion of the security document through the at least one aperture.

68. A security element according to claim 65, manufactured using a method comprising:

providing a first portion of the security document, the first portion of the security document having at least one aperture therethrough, the or each aperture being defined by an internal surface of the first portion of the document; and printing through the first portion of the security document onto a second portion of the security document provided behind the first portion of the security document, such that ink is deposited onto at least a part of the second portion of the security document aligned with the at least one aperture.

69. A security document comprising at least one security element in accordance with claim 65.

70. A security document according to claim 69, wherein the security document is any of: currency, a banknote, a certificate, a passport booklet, an identification card, a certificate of authentication and a driving licence.

* * * * *